United States Patent

[11] 3,631,961

[72] Inventor Mauritz L. Strydom
  75-Buitekringweg, Dalsig, Stelenbosch, Republic of South Africa
[21] Appl. No. 823,572
[22] Filed May 12, 1969
[45] Patented Jan. 4, 1972
[32] Priority May 22, 1968
[33] Republic of South Africa
[31] 68/3288

[54] REGULATING THE FLOW OF MATERIAL SUCH AS TOBACCO CUT RAG
1 Claim, 2 Drawing Figs.
[52] U.S. Cl. .................................................. 198/37, 198/39
[51] Int. Cl. .................................................. B65g 43/08
[50] Field of Search ............................................ 198/42, 37, 39; 131/108, 109

[56] References Cited
UNITED STATES PATENTS
2,570,270 10/1951 Patterson .................. 131/108 AA
2,985,277 5/1961 Prellwitz ..................... 198/39
3,139,217 6/1964 Mell ............................ 198/39
3,189,166 6/1965 Ziller ........................... 198/187
2,682,332 6/1954 Isbell ........................... 198/220 BA Primary Examiner—Richard E. Aegerter
Attorney—Young & Thompson ABSTRACT: In a system for feeding cut rag tobacco the cut rag is fed by a variable-speed conveyor past a mass rate detector such as a dielectric detector or a nucleonic detector, onto a constant speed conveyor. The detector controls the speed of the variable conveyor in a manner calculated to keep the average mass rate constant. The constant speed conveyor delivers over a lip which is angled to the direction of movement by an angle $\theta$, defined by Tan $\theta = W/D$ where $W$ is the width of the stream of cut rag and $D$ is the length of the stream over which the average mass rate equals the desired constant mass rate.

PATENTED JAN 4 1972
3,631,961
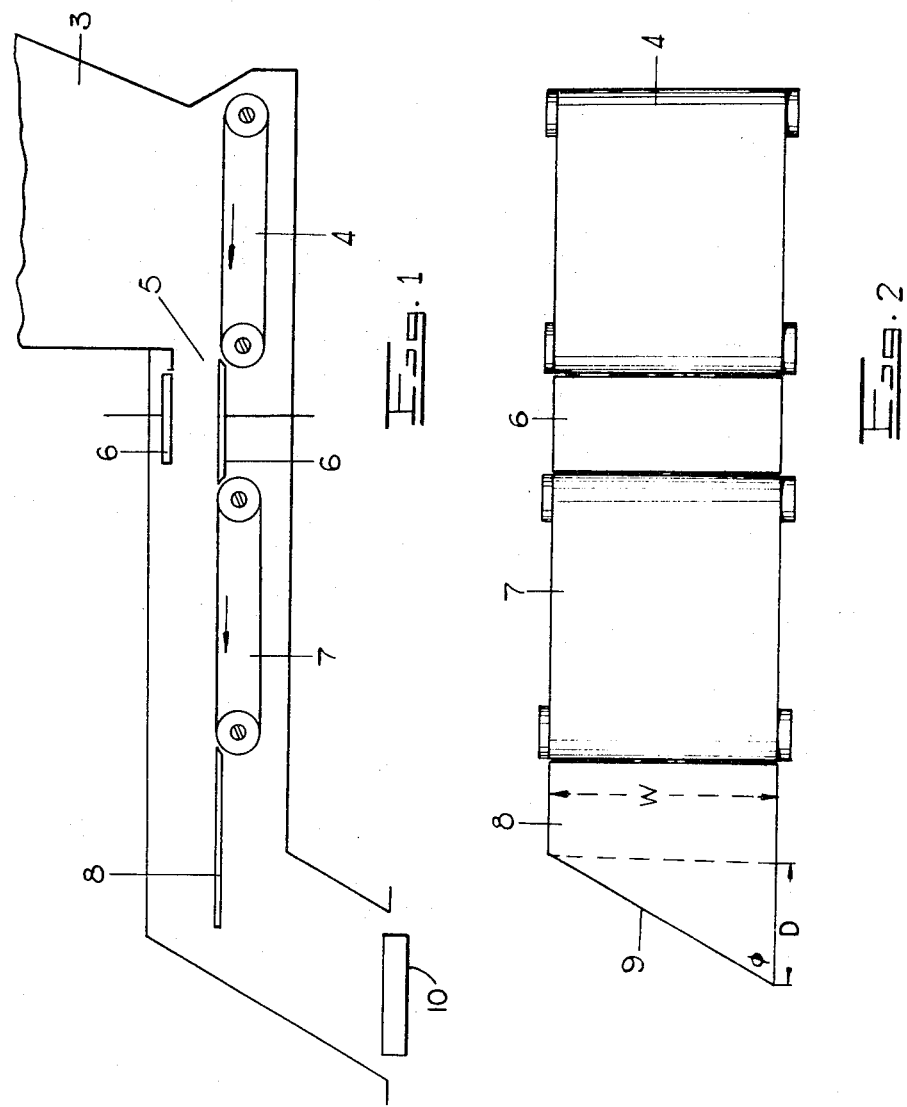
INVENTOR
MAURITZ L. STRYDOM
By Young & Thompson
ATTYS.

REGULATING THE FLOW OF MATERIAL SUCH AS TOBACCO CUT RAG

This invention relates to the regulation of the flow of material such as tobacco cut rag.

If tobacco strands are fed into a hopper and withdrawn at the base of the hopper by a conveyor belt past an orifice, it often happens that the density of the material is such that the cut rag is not delivered at a constant mass rate.

Of course, by regulating the speed of the conveyor in response to the measured mass rate, the average mass rate could be adjusted to be at more or less a constant value. However, over short time intervals, the actual rate may vary considerably from the average and a variation in one sense imposes an equal and opposite variation in the other sense upon the system.

The latter difficulty can be overcome by forward coupling, but unfortunately this is not practicable in most control systems. Feedback is invariably used with the resultant short term variation.

An object of the invention is to provide a system in which the variation is minimized.

The present invention provides a method of regulating the flow of material consisting in the steps of conveying the material at a variable rate, detecting the rate at a particular point, utilizing the detected information to vary the rate of conveyance in a sense tending to keep the rate at the point constant and transferring the material from the point in a delivery stream at a constant linear speed, characterized, by the step of constantly taking on oblique slice of the stream and removing the sliced material at a rate faster than that at which the delivery stream is moving.

It also provides a system for regulating the flow of material consisting in means to convey the material at a variable rate, a mass rate detector past which the variable conveying means conveys the material, a feedback from the mass rate detector to the variable conveying means to vary the rate of conveyance in a sense tending to keep the rate at the mass rate detector constant, and constant speed conveying means for removing material from the mass rate detector, characterized by an apron over which the constant speed conveying means delivers the material, the apron being angled across the stream of material to deliver an oblique slice of material, and by means for removing material passing over the lip at a faster rate than the constant speed conveying means moves it over the lip.

The variable-rate conveyor may be a belt conveyor the speed of which may be varied or a conveyor running at constant speed through a variable orifice.

The mass rate detector may be a detector responsive to a radioactive source but will preferably be means to sense the dielectric constant of material being delivered by the variable conveyor.

The invention is further discussed with reference to the accompanying drawings, in which:

FIG. 1 is a diagrammatic elevation of a system for feeding cut rag into carding apparatus, and FIG. 2 is a diagrammatic plan view of the device of FIG. 1.

In the illustrated apparatus a hopper 3 has a variable-rate conveyor 4 at its base which conveyor feeds cut rag through an orifice 5. The conveyed rag passes between two plates 6 the dielectric constant between which is constantly measured by means not shown. If the dielectric constant varies from a predetermined value, the speed of the belt 4 is varied so that over a period of time the average density of material passing between the plates 6 remains constant at a predetermined value.

From the plates 6 material passes onto a constant rate conveyor 7 which in turn delivers material onto a plate 8 formed with an angled lip 9.

Owing to the time lag inherent in any control system, the density of cut rag emerging from between the plates 6 varies as a function of the decrement of the control system. It may be considered that parallel transverse layers of varying density are being delivered by the conveyor 7 to the plate 8. The angle of the lip 9 is so chosen that the average density across parallel layers coincides very closely with the predetermined density figure.

Material passing over the lip 9 drops away immediately in the illustrated embodiment. Of course, it can also be removed by a conveyor 10 at right angles to the lip 9 which runs at a faster speed than the conveyor 7.

The plates 6 may, of course, be replaced by a nucleonic density meter, the output from which controls the belt 4.

Also it is possible to keep the speed of the belt 4 constant, but in this case the area of the orifice 5 is varied in response to the signals from the density meter.

The crux of the invention is the angled apron 9 and it is important to choose the correct angle $\theta$ (FIG. 2). The choice may be made quite successfully by trial and error for a given system or the angle may be calculated. The angle, $\theta$, in degrees may be calculated from the following formula:

$$\tan \theta = W/D$$

where $W$ is the width of the stream of cut rag and $D$ that length of cut rag, in the direction of travel, over which the average mass rate is the desired constant mass rate. Again, $D$ can be determined by trial and error. However, it is believed that $D=T_fV$ where $T_f$ is the time in seconds of the delay in the feedback becoming effective or the time delay of the electrical feedback and of the conveyor in moving the material forward at the adjusted rate. $V$ is the speed in units of length per second of an infinitely thin transverse layer of material passing the detector at the desired constant rate.

If the angle $\theta$ is correctly chosen the variation in the instantaneous rate at which material drops over the lip 9 is kept to a minimum and for practical purposes may be considered to be constant.

I claim:

1. A system for regulating the flow of material, comprising a hopper, means to convey the material from the hopper at a variable rate, a mass rate detector past which the variable conveying means conveys the material, a feedback from the mass rate detector to the variable conveying means to vary the rate of conveyance in a sense tending to keep the rate at the mass rate detector constant, constant speed conveying means for removing material from the mass rate detector, an apron over which the constant speed conveying means delivers the material, the apron having a lip angled across the stream of material to deliver an oblique slice of material, and means for removing material passing over the lip at a faster rate than the constant speed conveying means moves it over the lip, the angle of the apron being determined by the formula:

$$\tan \theta = W/D$$

where $\theta$ is the angle measured in degrees, $W$ is the width of the stream, and $D$ that length of the stream of material over which the average mass rate equals the desired constant mass rate, $D$ being equal to $T_fV$ where $T_f$ is the time in seconds taken by the feedback mechanism and the variable conveying means to average the rate of flow past the mass rate detector to the desired constant rate, and V is the speed in units of length per second of an infinitely thin transverse layer of material passing the mass rate detector at the constant rate.

* * * * *